United States Patent [19]
Bentley

[11] 3,774,270
[45] Nov. 27, 1973

[54] EXHAUST SYSTEM CLAMP ASSEMBLY

[75] Inventor: Daniel L. Bentley, Davison, Mich.

[73] Assignee: General Motors Corporation, Detroit, Mich.

[22] Filed: Oct. 20, 1972

[21] Appl. No.: 299,188

[52] U.S. Cl. .................................................. 24/276
[51] Int. Cl. ............................................. B65d 63/00
[58] Field of Search ........................... 285/197, 198; 24/275, 276

[56] References Cited
UNITED STATES PATENTS

| | | |
|---|---|---|
| 1,214,308 | 1/1917 | Inglis ................................. 24/276 |
| 1,947,715 | 2/1934 | Heuer ................................. 24/275 |
| 3,109,215 | 11/1963 | Brown ................................. 24/276 |

FOREIGN PATENTS OR APPLICATIONS

| | | |
|---|---|---|
| 607,240 | 10/1960 | Canada .............................. 24/276 |

*Primary Examiner*—Donald A. Griffin
*Attorney*—J. L. Carpenter et al.

[57] ABSTRACT

A two-piece exhaust system clamp assembly includes a flexible wire clamp wrapped around an exhaust system component and having a threaded shank at one end thereof which is inserted through an eyelet formed at the other end. A shouldered nut is rotatably journalled in the eyelet and threaded over the shank to apply a clamping force about the circumference of the component.

1 Claim, 4 Drawing Figures

Patented Nov. 27, 1973

3,774,270

EXHAUST SYSTEM CLAMP ASSEMBLY

The present invention relates to a clamping device for use in exhaust systems of motor vehicles.

More particularly, the invention comprehends a one-piece flexible wire clamp which encircles a component of an exhaust system and is contractible thereabout to provide a clamping load to secure the exhaust component to another component or to the motor vehicle. The clamp includes a flexible loop which encircles the exhaust component. A tangential threaded shank at one end of the loop is insertable through a circular eyelet formed at the other end thereof. A shouldered nut is threaded over the shank and includes a bushing section rotatably journalled in the eyelet. Upon tightening of the nut, the loop is contracted to apply a clamping load to the exhaust component. This simple two-piece construction is effective to secure two telescoping exhaust components together or to engage a vehicle mounted bracket and support the exhaust system therefrom.

The above and other features of the present invention will be apparent to one skilled in the art upon reading the following detailed description, reference being made to the accompanying drawings illustrating a preferred embodiment of the present invention in which.

Figure 1:
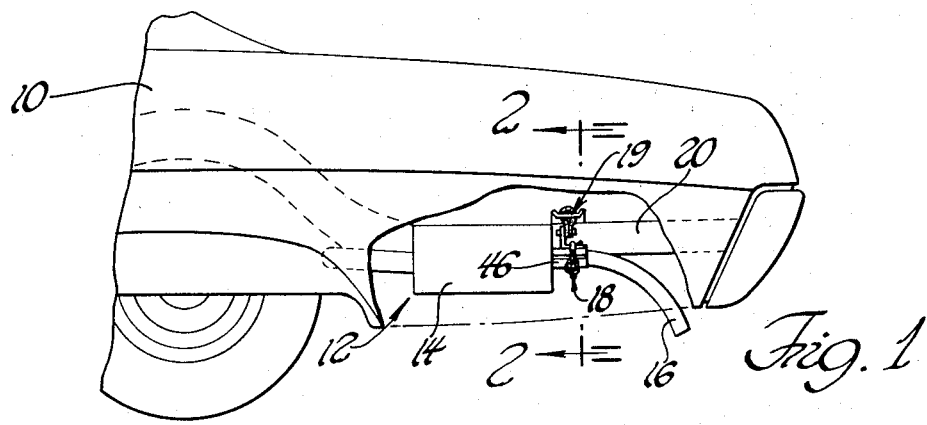
FIG. 1 is a partial side view with portions broken away of a motor vehicle having an exhaust system embodying a clamp assembly made in accordance with the present invention.

Referring to FIG. 1, there is shown a motor vehicle 10 having a longitudinally extending exhaust system 12. The system 12 includes an attenuating device such as a resonator 14 and a tail pipe 16. A clamp assembly 18 fixedly interconnects the resonator 14 and the tail pipe 16. By means of a bracket 19, the clamp assembly 18 secures these components to the frame 20 of the vehicle 10.

Figure 2:
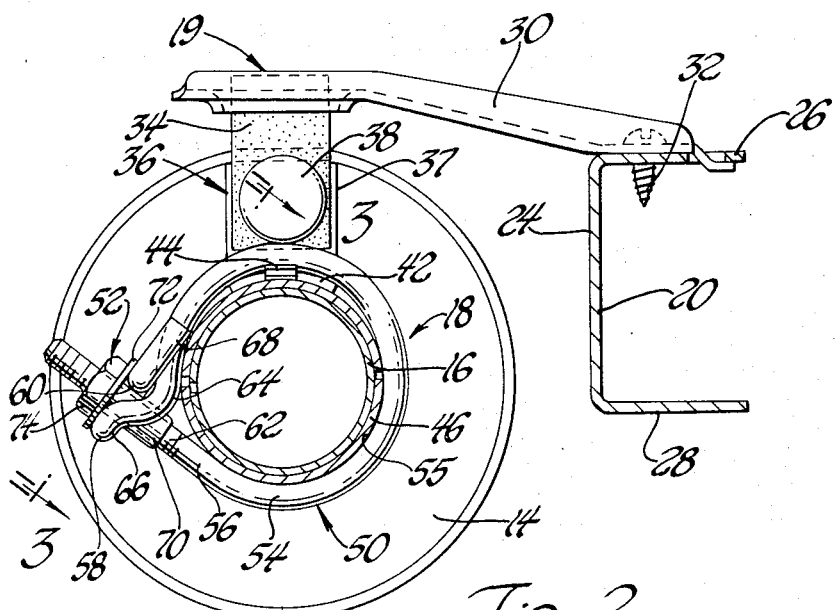
FIG. 2 is an enlarged view taken along line 2—2 of FIG. 1 showing the clamp securing the exhaust system to a vehicle mounted bracket.

Referring to FIG. 2, the frame 20 comprises a side rail 24 and upper and lower flanges 26, 28 respectively. The bracket assembly 19 includes a lateral mounting arm 30 which is fixed at one end to the upper flange 26 by a fastener 32. A flexible elastomeric strap 34 downwardly extends from the other end of the arm 30. An L-shaped bracket member 36 includes a vertical leg 37 connected to the strap 34 by a fastener 38 and a longitudinal arcuate leg 42 which partially overlies the end of the resonator 14. The leg 42 includes an upwardly staked tang 44 at its rearward end which serves to locate the clamp assembly 18.

Figure 3:
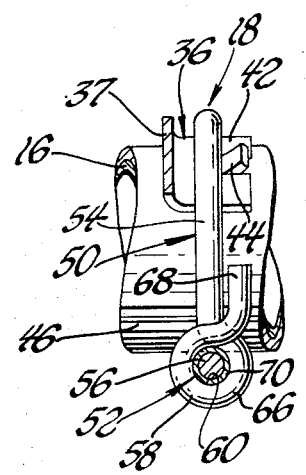
FIG. 3 is a view taken along line 3—3 of FIG. 2.

Referring additionally to FIG. 3, the forward end of the tail pipe 16 is telescopically received within a longitudinally split outlet end 46 of the resonator 14. The subject clamp assembly 18 applies a clamping load to the outer surface of the split outlet end 46 to contract the latter and fixedly clamp the tail pipe 16 thereto. Additionally the clamping secures the end 46 to the bracket member 36 to support the exhaust system 12 and components thereof from the bracket assembly 19 and the frame 20.

Figure 4:
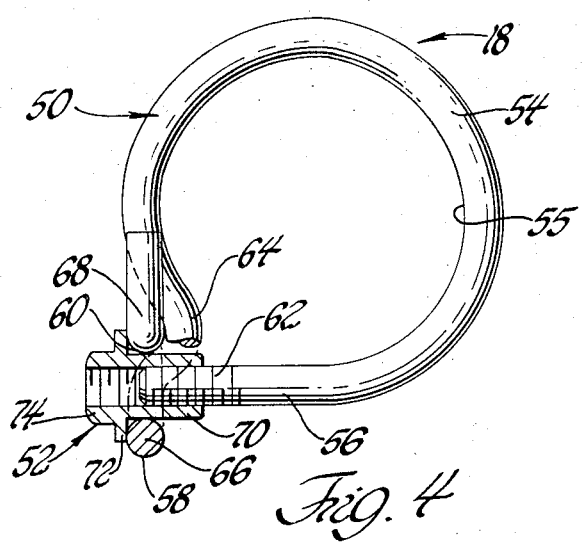
FIG. 4 is a partially sectioned side elevational view of the clamp assembly.

The two-piece clamp assembly 18 as shown in FIGS. 2 through 4 comprises a flexible wire clamp 50 and a shouldered nut 52. The flexible clamp 50 includes a first loop or arcuate intermediate section 54 defining an opening 55. A first straight end section 56 is disposed tangentially to the first loop at one end of the clamp 50. An eyelet 58 is formed at the other end. The eyelet 58 is also disposed tangentially to the intermediate section 54. The eyelet 58 has an opening 60 coaxially aligned with the straight end 56 in a plane normal to the opening 55.

The first straight end section 56 terminates with a threaded shank 62 which registers in the free form with the opening 60. The eyelet 58 comprises an undulating bend 64 defining an axial groove and terminating with a circular eyelet loop 66. The eyelet loop 66 has a free end 68 disposed in the groove in overlying relationship with the bend 64.

The shouldered nut 52 is internally threaded for engagement with the threaded shank 62. The shouldered nut includes a lower cylindrical bushing section 70 rotatably journalled within the opening 60 of the eyelet loop 66. The nut 52 further includes an intermediate annular flange 72 which engages the top surface of the eyelet loop 66 and a hexagonal upper end 74 adapted to be engaged by a suitable adjusting tool. In assembly, the intermediate section 54 is expanded slightly to pass over tail pipe 16 and the end 46. The clamp 50 is positioned over the bracket member 36 as located thereon by the tang 44 (FIG. 3). As the shouldered nut 52 is tightened, the annular flange 72 bears against the eyelet loop 66. This contracts the opening 55 such that the intermediate section 54 applies a clamping load against the outer periphery of the end 46 and the bracket member 36. In this manner, the simple two-piece clamping assembly serves to interconnect the exhaust components and to support the exhaust system 12 and components on the vehicle body.

Although only one form of this invention has been shown and described, other forms will be readily apparent to those skilled in the art. Therefore, it is not intended to limit the scope of this invention by the embodiments selected for the purpose of this disclosure but only by the claims which follow.

What is claimed is:

1. In a motor vehicle exhaust system, a two-piece clamp assembly for mounting an exhaust system component comprising: a contractible clamp formed from a single piece of flexible wire, said clamp including an intermediate section defining a first loop having an inner periphery engageable with the surface of the component, said clamp having a straight first end disposed tangential to said first loop and having a threaded shank formed thereon, said clamp further having a circular eyelet formed at the other end disposed tangential to said first loop, said eyelet including a closed loop having a free end overlapping said first loop and defining an opening normal to the first loop and registering with said first end and into which said threaded shank is received; and an internally threaded shouldered nut engaging said shank having a bushing end journalled in the opening of said closed loop and having an annular flange bearing against the closed loop, said nut having a head section adapted to be engaged by an adjusting tool whereby adjustment of said nut contracts the first loop to apply a clamping load against said component.

* * * * *